United States Patent
Zielonko et al.

[11] 3,927,368
[45] Dec. 16, 1975

[54] METHOD OF BREAKING ELECTRIC NETWORKS FOR MEASUREMENT OF PARAMETERS OF NETWORK COMPONENTS

[75] Inventors: Romuald Zielonko, Sopot; Jerzy Hoja, Gdansk-Wrzeszcz; Henryk Wojciechowski, Gdansk, all of Poland

[73] Assignee: Politechnika Gdanska, Gdansk, Poland

[22] Filed: Apr. 4, 1974

[21] Appl. No.: 458,359

[30] Foreign Application Priority Data
Apr. 7, 1973  Poland.............................. 161757

[52] U.S. Cl............................ 324/57 R; 324/62
[51] Int. Cl.²....................................... G01R 27/02
[58] Field of Search............................ 324/57 R, 62

[56] References Cited
UNITED STATES PATENTS
3,411,081  11/1968  Schulz................................. 324/62
3,702,970  11/1972  Stetzler........................... 324/57 X Primary Examiner—Stanley T. Krawczewicz
Attorney, Agent, or Firm—Waters, Schwartz & Nissen

[57] ABSTRACT

A method for creating "virtual" open circuitry in electric networks for the purpose of measuring the parameters of individual network components with either D.C. or A.C. methods of measurement. The method provides the possibility of a full or partial isolation of an element from a network, thus eliminating the shunting effect of the network. The method may be used for the automatic checking of parameters of passive and active components of electronic systems and installations. The circuit consists of a voltage follower whose amplification factor is close to a unity, said follower having a very high input impedance. The cathode follower is appropriately connected to adjacent network vertices which are connected with a junction of the components to be measured through a branch to be broken in order to provide isolation.

4 Claims, 1 Drawing Figure

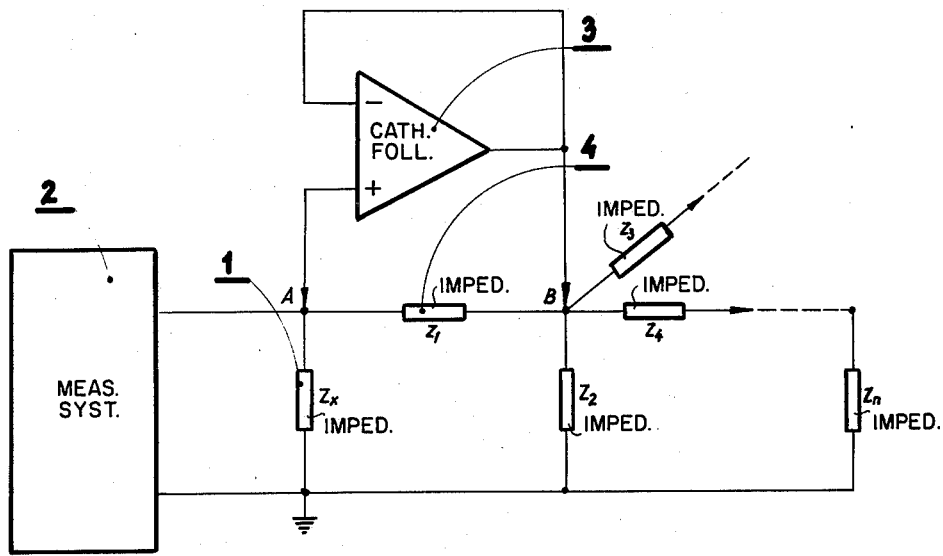

METHOD OF BREAKING ELECTRIC NETWORKS FOR MEASUREMENT OF PARAMETERS OF NETWORK COMPONENTS

The invention relates to methods of breaking up or isolating the parts of electric networks by the creation of virtual open circuits for the purpose of measuring the parameters of network components, said method eliminating the need for the physical breaking up of a network. The method of the invention is suitable for the checking of components of electronic systems, as well as for all cases in which the breaking up of a network is needed without breaking the connection of its branches.

Until recently, the measurement of electronic elements of the R, L or C type, namely of varistors, transistors and solid state systems included in complex electric networks, was a difficult problem because of the shunting effect imposed by the remainder of the network upon the element to be measured.

The measurement of an element while connected with the rest of a network was possible only in some particular cases in which the measured element was favorably placed in the network. In the majority of cases, in order to eliminate the shunting effect of the network, the measured element had to be either removed from the network, or at least one of its connection with the associated network had to be disconnected.

A disadvantage of the above-mentioned method is that the dismounting of an element from a system or installation, or the breaking of the connections of the element, is not always possible or permitted. Even if it is possible, then it is usually difficult and expensive as well as labor and time consuming. Besides, any intrusion with mechanical tools into a system presents a potential risk of damage, and for this reason such as intrusion should be avoided.

For the above mentioned reasons, the checking of elements in electronic systems or installations for defects has been a very troublesomee problem. Furthermore, the automatic measuring systems used until recently for the checking of parameters of elements on mounting plates of electronic devices have been in no respect capable of covering the measurement of all types of elements, and a complex checking of systems has not been possible.

An object of the present invention is to provide a method for removing the shunting effect of a network during the measurement of parameters of network components, this measurement being effected in the network without the need for a mechanical breaking off of its branches.

This object has now been attained by using voltage followers transmitting a measuring potential of one of the two network vertices, these vertices being identical with the terminals of the element to be measured and being called in the following text a "vertex of breaking", to those vertices of the network which are connected with the vertex of breaking, the latter vertices being called in the following text the "adjacent vertices".

The followers are connected to the measured element in such a way that the signal input terminals are connected with the vertex of breaking, while the signal output terminals of the followers are connected to the adjacent vertices. The number of the followers is equal to the number of connections which are broken. In a particular case in which a single connection is to be broken, then the use of a single follower is sufficient. The connections which are broken may be the connections having an impedance different from zero.

The method of breaking up electric networks in accordance with the invention is easy in paractical use since it does not call for special preparation of the network for measurements, it does not disturb the structure of the network, and all that is required is a simple parallel connection of the followers to the vertices of the network, this operation being quite simple from a technical point of view.

This simplicity is one particular advantage of the method of the invention. Another commendable quality of the method is the possibility of measuring by using both direct and alternating current methods of measurement. The measured elements may be passive elements of the R, L, C type and impedances, diodes or varistors, as well as active elements such as transistors and digital and linear solid state systems. The method may be used for the automatic checking of components of electronic systems and installations, thus considerably increasing the range of elements which may be measured, this in consequence bringing about an improved degree for complex checking.

According to the present invention there is provided a method of creating a virtual open circuit in an electrical network wherein the potential at a terminal is transmitted by means of a high input impedance voltage follower whose amplification factor is close to unity to an adjacent network terminal, said terminals being interconnected by a network impedance element.

Further according to the present invention there is provided a method of measuring in situ a parameter of an electrical component which forms part of an electrical network having loops formed by impedance elements, said method comprising applying a parameter-measuring device in parallel with said component and creating a 'virtual' open circuit in each of the loops of the network which shunt said component, each said 'virtual' open circuit being effected by a high input impedance voltage follower of near-unity gain connected in parallel with a loop impedance element, the output of each voltage follower feeding into another loop impedance element.

The method of breaking up an electric network in accordance with the invention is better explained by way of a simple example shown in the annexed drawing which illustrates a part of an electric network with a measuring system and a follower connected to that network, the measured element in this case being an impedance, and the vertex of breaking being connected with the network only through a single arm.

The network under consideration by way of illustration consists of impedances $Z_x, Z_1, Z_2, Z_3, Z_4, \ldots Z_N$. To element 1, said element being the impedance $Z_x$, a measuring system 2 is connected in parallel. Also connected to element 1 is the input of a voltage follower 3 whose amplification factor is close to a unity, said voltage follower having a very high input impedance. The signal terminal of the follower input is connected with a vertex A of breaking. The output of the follower is connected to a vertex B, said vertex being connected in turn with vertex A through an arm 4 including impedance $Z_1$. In the above, measuring system 2 may be any known measuring system for electrical characteristics such as shown, for example, in Electrical Measurements by Frankhaws, McGraw-Hill Book Company, Inc., 1938.

The single source feeding a signal to the network is the measuring system 2.

The voltage follower 3 transmits the potential of vertex A to the vertex B, thus causing (with the follower amplification being close to a unity) the difference in potential between the vertices A and B, namely the voltage in the impedance $Z_1$, to be close to zero. In this way, the current flowing through impedance $Z_1$ is close to zero, and the impedance between vertices A and B is close to the infinity. In practice, this is synonymous with an electric break or open circuit in the arm 4, and with the elimination of a shunting effect of the network upon the measured element 1.

The relationship between the substituting impedance shunting the measured element 1, said impedance being designated as $Z_b$, and the amplification and the input impedance of the follower is expressed by the formula:

$$Z_b = \frac{Z_{we}}{\frac{Z_{we}/1 - K/}{Z_1} + 1}$$

where $Z_{we}$ is the input impedance of the follower, and K is the amplification of the follower.

It follows from the above formula, that with amplification K tending toward unity and with impedance $Z_1$ being different from zero, the shunting impedance $Z_b$ tends toward $Z_{we}$. Under such condition the measured element is shunted by a very high input impedance of the follower. Micro-electronic voltage followers are known having input impedances of the order of $10^{10}\Omega$, this being commensurate with the leakage conductance of broken vertices of a network.

It will be appreciated that in networks of a more complex nature the component 1 to be measured will be shunted by a plurality of loops formed by impedance elements in which case a 'virtual' open-circuit must be formed in each of the network loops to enable the parameter measurement to be effected. This is achieved by using a plurality of voltage followers, the output of each follower feeding into a loop impedance element.

The described method of creating an open-circuit in an electric network is easy in practical use since it does not call for special preparation of the network for measurements, it does not disturb the structure of the network, and all that is required is a simple parallel connection of the followers to the appropriate terminals of the network, this operation being quite simple from the technical point of view.

This simplicity is the praiseworthy quality of the method. Another commendable quality of the method is the possibility of measuring by using both the direct and alternating current methods of measurement, the measured elements may be the passive elements of the R, L, C type and impedances, diodes, variators, as well as active elements such as transistors and digital and linear solid state systems. The measuring method may be used for the automatic checking of components of electronic systems and installations, thus considerably increasing the range of elements which may be measured.

What we claim is:

1. A method of isolating a network impedance element connected between two terminals in said network, said method comprising creating a virtual open circuit in said electrical network by transmitting a potential at one of said terminals by means of a high-input-impedance voltage follower whose amplification factor is close to unity to the other terminal.

2. A method of measuring in situ a parameter of an electrical component which forms part of an electrical network having interconnected branches constituted by impedance elements connected to said components, said method comprising applying a parameter-measuring device in parallel with said component and creating a virtual open circuit in each of the branches of the network which are connected to said component, said virtual open circuit being effected by connecting a high input impedance voltage follower of substantially unity gain in parallel with one of said branches.

3. A network comprising first and second impedance elements connected to each other, and a cathode follower of high input impedance and substantially unity gain coupled across one of said impedance elements whereby the latter constitutes a virtual open circuit permitting electrical measurements to be taken of the other of said elements as though no other element were connected thereto.

4. A network as claimed in claim 3 comprising measuring means connected to said other element.

* * * * *